United States Patent [19]

Kashiwabara et al.

[11] Patent Number: 5,333,943
[45] Date of Patent: Aug. 2, 1994

[54] METHOD AND SYSTEM FOR ANTI-LOCK BRAKING IN AUTOMOBILE BY MEASURING BRAKE TORQUE

[75] Inventors: Masuo Kashiwabara; Yoshikazu Tanaka; Hideki Sekiguchi, all of Isesaki, Japan

[73] Assignee: Japan Electronic Control Systems Co., Ltd., Isesaki, Japan

[21] Appl. No.: 136,592

[22] Filed: Oct. 14, 1993

Related U.S. Application Data

[63] Continuation of Ser. No. 857,418, Mar. 25, 1992, abandoned.

[30] Foreign Application Priority Data

Mar. 25, 1991 [JP] Japan ..................... 3-060245

[51] Int. Cl.$^5$ .............................................. B60T 8/52
[52] U.S. Cl. ................................. 303/112; 303/113.4
[58] Field of Search ................. 303/112, 113.2, 113.4, 303/DIG. 4

[56] References Cited

U.S. PATENT DOCUMENTS

| | | | |
|---|---|---|---|
| 3,790,225 | 2/1974 | Wehde | 303/113.4 |
| 3,923,345 | 12/1975 | Poggie | 303/112 |
| 4,747,643 | 5/1988 | Lanzer | 303/112 X |
| 4,768,840 | 9/1988 | Sullivan et al. | 303/112 X |
| 4,822,113 | 4/1989 | Amberg et al. | 303/112 X |
| 4,828,334 | 5/1989 | Salman | 303/112 X |
| 5,135,290 | 8/1992 | Cao | 303/112 X |

FOREIGN PATENT DOCUMENTS

| | | | |
|---|---|---|---|
| 443066 | 8/1991 | European Pat. Off. | 303/DIG. 4 |
| 56-39946 | 4/1981 | Japan | 303/DIG. 4 |
| 62-175248 | 7/1987 | Japan . | |
| 2-273278 | 10/1990 | Japan . | |
| 42365 | 2/1991 | Japan | 303/112 |
| 9011213 | 10/1990 | PCT Int'l Appl. | 303/112 |
| 9115386 | 10/1991 | PCT Int'l Appl. | 303/112 |

Primary Examiner—Robert J. Oberleitner
Assistant Examiner—Alfred Muratori
Attorney, Agent, or Firm—Foley & Lardner

[57] ABSTRACT

In an anti-lock braking apparatus, by detecting brake torque at a wheel and controlling the braking force of a wheel brake unit, a locked state of the wheel can be quickly detected to thus enable braking control with fast response characteristics. Also, based on direction of a variation of the brake torque on the wheel, the road friction coefficient is predicted to perform feedback control for the braking force and to adjust the brake torque to a target brake torque, whereby the braking performance can be optimized.

16 Claims, 7 Drawing Sheets

METHOD AND SYSTEM FOR ANTI-LOCK BRAKING IN AUTOMOBILE BY MEASURING BRAKE TORQUE

This application is a continuation of application Ser. No. 07/857,418, filed Mar. 25, 1992, now abandoned.

BACKGROUND OF THE INVENTION

(1) Field of the Invention

The present invention relates to an anti-lock braking method and apparatus for controlling a braking force imposed on wheels of an automotive vehicle. More particularly, the invention relates to an improvement of response characteristics in the braking force control to thereby obtain a stable braking performance.

(2) Related Art of the Invention

Most recent high-quality model vehicles are equipped with an anti-lock brake apparatus (hereafter referred to as "ABS") for restricting wheel slip during braking and to improve the braking thereof.

The ABS compares a wheel speed $V_W$ and a vehicle speed $V_B$ (for example, a projected vehicle speed is obtained on the basis of the wheel speed and wheel acceleration and deceleration) to obtain a wheel slip ratio $S \{=(V_B-V_W)/V_B\}$, and the braking force exerted on the wheel is controlled so that the wheel slip ratio is maintained within a predetermined range (near 0.15–0.3) to thereby minimize a braking distance (see Japanese Patent Application No. 2-273278).

In the conventional ABS's employing the foregoing control systems, however, the braking force control is initiated after detecting a wheel slippage induced by a locked condition of the wheel and therefore, a relatively long response delay occurs from the locking of the wheel to the initiation of the brake control operation.

SUMMARY OF THE INVENTION

In view of the problem of the prior art, an object of the present invention is to quickly detect a locked state of a wheel by detecting a torque at the wheel axle, and to perform a braking force control with fast response characteristics.

Another object of the invention is to precisely detect the torque at the wheel axle by appropriately selecting the position at which the axle torque is detected, and thus improve the accuracy of the control.

A further object of the invention is to perform a control of a braking force of a wheel brake unit with characteristics depending upon a road friction coefficient predicted on the basis of the detected torque at the wheel axle, to thereby optimize the braking performance.

To accomplish the above objects in accordance with the present invention, there is provided an anti-lock braking method and an apparatus for an automotive vehicle, for controlling a braking force of a wheel brake unit to thereby restrict slippage at a wheel, the method comprising the step or means of:

a brake operation detecting step or means for detecting an operation of a wheel brake unit;

a brake torque detecting step or means for detecting a brake torque at the wheel; and a braking force control step or means for controlling a braking force of the wheel brake unit depending upon conditions including the brake torque detected in the brake torque detecting step or means, while the operation of the wheel brake unit is detected.

With the construction set forth above, since the brake torque on the wheel is significantly varied when the wheel speed is abruptly lowered and causes wheel slippage, by detecting this condition and controlling the braking force of the wheel brake unit depending upon the brake torque, a control can be performed with a fast response characteristics and with a high degree of precision.

The position for detecting the torque in the brake torque detecting step or means may be between a wheel tread and the wheel brake unit.

With such a torque detecting position, a value substantially equal to the brake torque acting on the wheel tread can be detected, to enable a precise detection of the occurrence of wheel slippage, and accordingly, an optimal control.

On the other hand, the position for detecting the torque in the brake torque detecting step or means can be between the wheel brake unit and a shaft for driving the wheel.

With such a torque detecting position, the brake torque, which is a torque obtained by subtracting the braking torque from the brake torque at the wheel, i.e., the torque at the shaft for driving the wheel, can be detected. The direction of the detected torque becomes negative since the wheel is driving the driving shaft while the wheel slippage is not caused by taking the torque direction for driving the wheel from the driving shaft, whereas, when wheel slippage is caused, the direction of the detected torque becomes positive since the rotational inertia force on the side of the driving shaft acts to rotate the wheel. Therefore, the occurrence of wheel slippage can be detected. Accordingly, even at such a brake torque detecting position, an improved control can be obtained.

On the other hand, the braking force control may include a control for increasing the braking force when the detected torque is a negative value having an absolute value greater than a predetermined torque set value T1, which is set at a negative value by taking the torque in a direction in which the driving torque for driving the wheel is transmitted from the wheel driving axle to the wheel.

With such a construction, by an operation of the braking force to the wheel, the absolute value of the negative value of the brake torque is decreased. Therefore, when the absolute value is excessively large, it is judged that the braking force is too small, to thus increase the braking force and provide proper braking force control.

Similarly, the braking force control may include a control for reducing the braking force when the detected torque is greater than a torque set value T2, which is set at a positive value close to 0 by taking the torque in a direction in which the driving torque for driving the wheel is transmitted from the wheel driving axle to the wheel.

With such a construction, in a locked state of the wheel, the detected brake torque on the wheel is reversed toward the positive direction due to the inertial rotational force of the drive mechanism connected to the wheel, the locked state of the wheel can be detected there from, and a locking of the wheel can be avoided by reducing the braking force to provide a proper braking force control.

Furthermore, the braking force control may perform a braking force control with characteristics depending upon a road friction coefficient predicted on the basis of the brake torque at the wheel immediately before decreasing the brake torque when the brake torque on the wheel detected in the brake torque detecting step is decreased while the braking force of the wheel brake unit is not decreased.

Also, the braking force control may perform a braking force control with characteristics depending upon a road friction coefficient predicted on the basis of the brake torque at the wheel immediately before a decrease of the brake torque when the brake torque on the wheel detected in the brake torque detecting step or means is decreased while the braking force of the wheel brake unit is not decreased.

With such a construction, upon the occurrence of a locking of the wheel, the brake torque on the wheel is decreased while the braking force (hydraulic pressure) is not decreased. Immediately before this, the brake torque becomes the maximum torque, which is the value derived by multiplying the maximum friction force generated between the wheel and the road surface by the diameter of the wheel. Since the maximum friction force is calculated from the vehicular specification (weight) and the road friction coefficient, the road friction coefficient can be calculated and the maximum torque can be detected.

Therefore, by taking the brake torque on the wheel detected by the brake torque detecting step or means immediately before decreasing of the brake torque, the road friction coefficient is predicted. With the characteristics derived on the basis of the predicted road friction coefficient, the braking force control means controls the braking force of the wheel brake unit to provide control with a high degree of precision.

On the other hand, as the braking force control is on the basis of the predicted road friction coefficient, the braking force control may set a target brake torque at the wheel on the basis of the predicted road friction coefficient, and perform a feedback control for the braking force at the wheel brake unit to bring the brake torque on the wheel close to the target brake torque.

With such a construction, since the maximum brake torque at the wheel without causing wheel slippage is obtained from the road friction coefficient, control with a high degree of precision can be performed by making the target brake torque correspond to the maximum brake torque.

Furthermore, the braking force control step or means may update the target brake torque with a value that is gradually increased until a new road friction coefficient is predicted.

With such a construction, once the wheel slippage is caused, the braking force is decreased, but in the subsequent cycles, a control is repeated to gradually increase the braking force until the wheel slippage is again caused. Accordingly, the braking performance can be improved while suppressing the occurrence of wheel slippage.

The objects of the present invention will become more clear from the description given below with reference to the accompanying drawings.

DETAILED DESCRIPTION OF THE EMBODIMENT

An embodiment of the present invention will be discussed herebelow with reference to the drawings.

Figure 1:
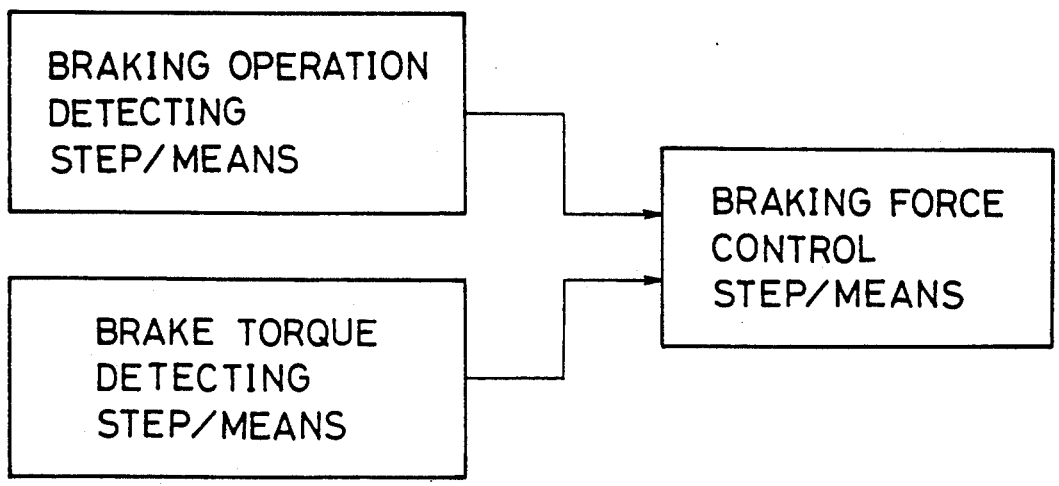
FIG. 1 is a block diagram showing the basic construction of the present invention.
Figure 2:
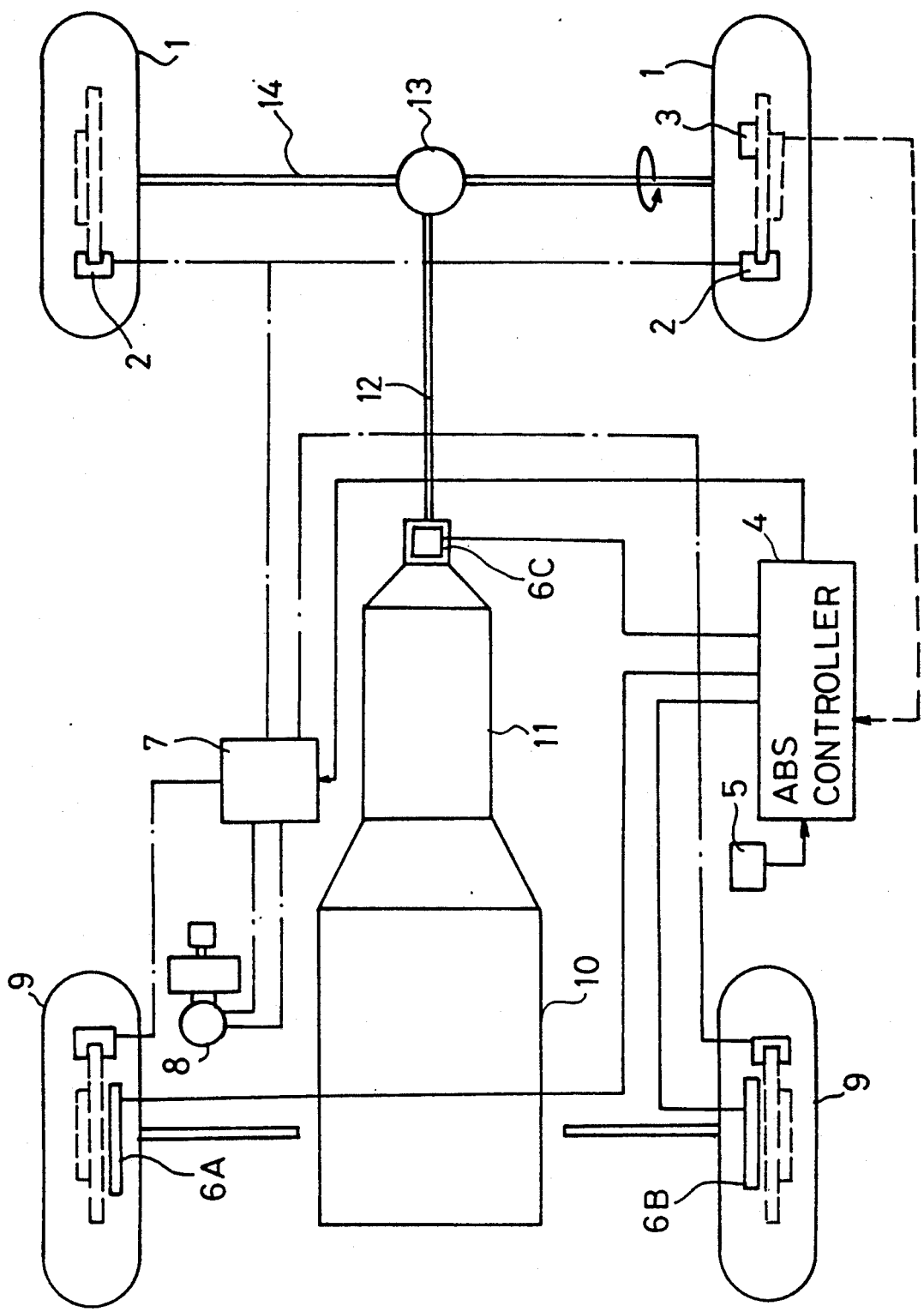
FIG. 2 is a fragmented plan view showing one embodiment of the present invention.
Figure 3:
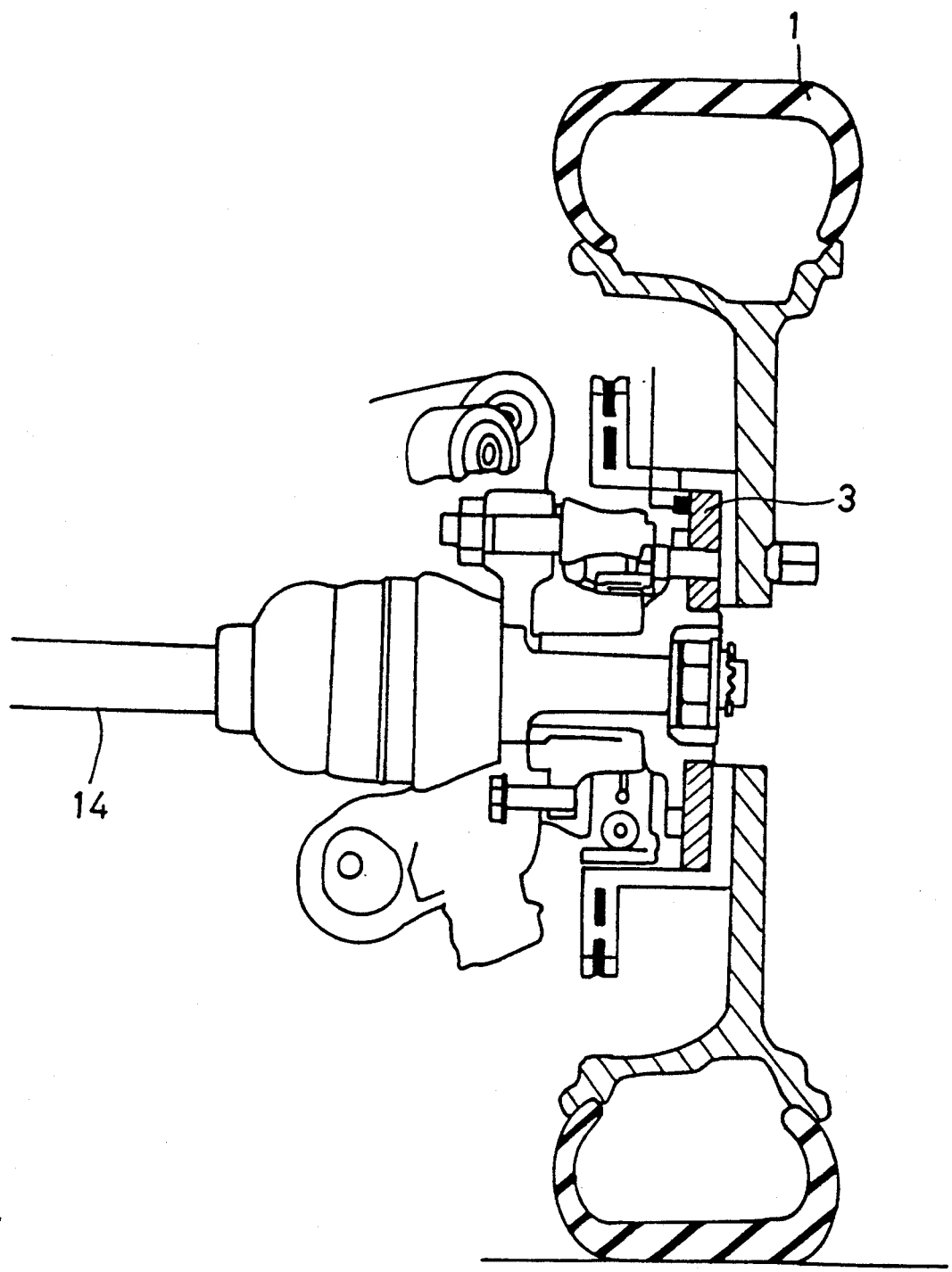
FIG. 3 is a longitudinal section view of an axle torque detecting section in the embodiment of FIG. 2.

In FIGS. 2 and 3, a torque sensor 3 as a brake torque detecting means for detecting a braking torque on a wheel axle is provided in a wheel brake unit 2 for a rear wheel 1 for detecting a braking torque on the rear wheels which are driving wheels in the shown vehicle having a rear wheel drive power train layout. A brake torque detecting signal of the torque sensor 3 representative of the brake torque at the rear wheels 1 is fed to an ABS controller 4.

Here, the torque to be detected by the torque sensor 3 is detected as a total torque of a torque obtained by multiplying an inertia moment I of the rear wheels 1 and connecting both by an angular acceleration $d\omega/dt$ ( during deceleration, it becomes a negative value by taking the direction of forward rotation of the wheel as positive), a torque induced by an engine braking effect, and a braking torque by frictional force of the wheel brake unit 2. This torque is balanced by a brake torque exerted on the rear wheel 1 by the road friction force. Therefore, the brake torque can be precisely detected.

Figure 4:
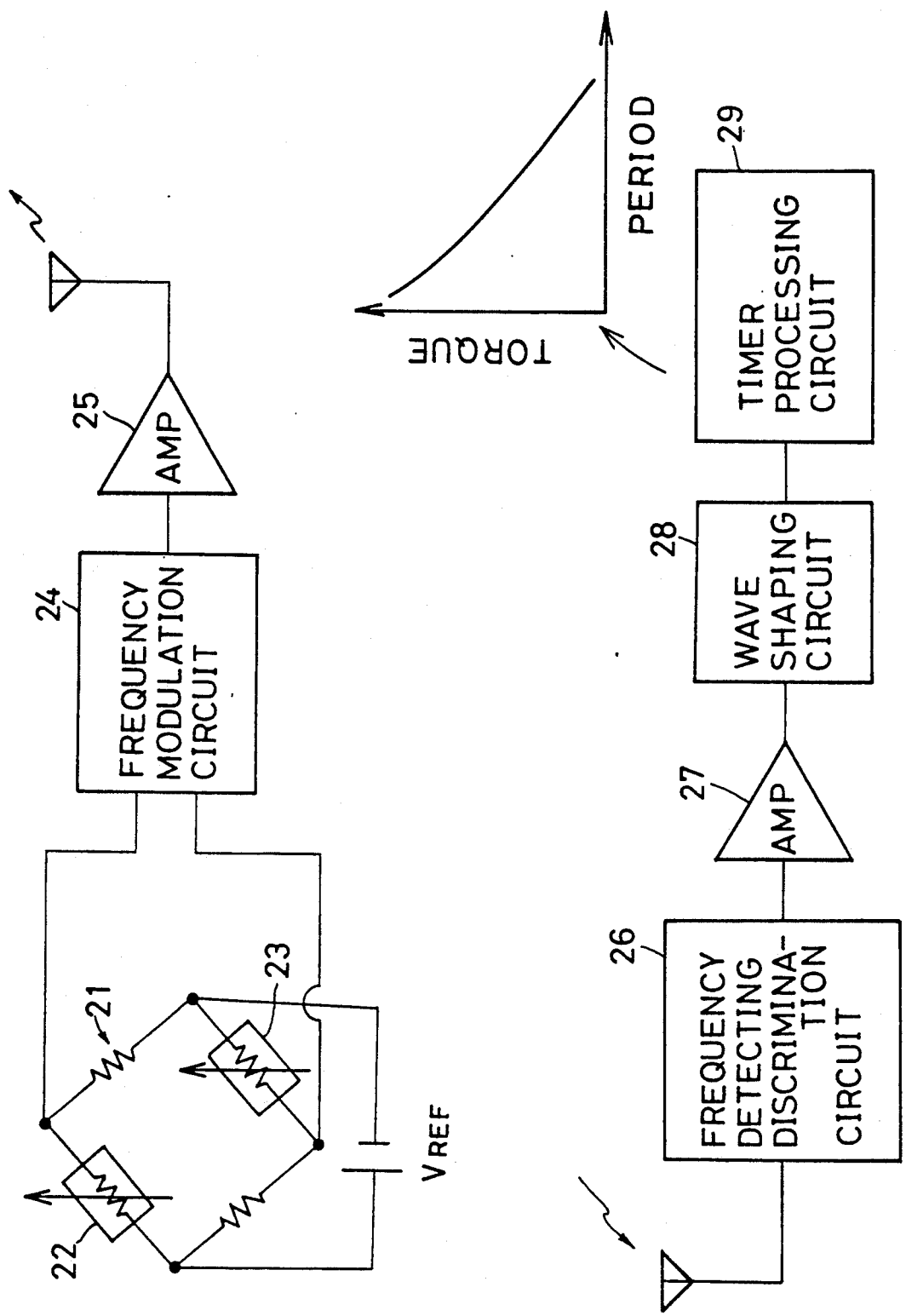
FIG. 4 is a circuit diagram of a torque sensor and a torque signal receiving circuit in the embodiment of FIG. 2.

The circuit constructions of the torque sensor 3 and a brake torque detecting signal receiving circuit are illustrated in FIG. 4. Two strain gauges 22 and 23 forming a bridge circuit 21 are distorted in a magnitude corresponding to the torque to be detected, and by the distortion of the strain gauges 22 and 23, a terminal voltage of the bridge is varied. The terminal voltage of the bridge is frequency modulated by a frequency modulation circuit 24, amplified by an amplifier 25, and the amplified frequency modulated signal is transmitted. The transmitted signal is received by the ABS controller 4. By a frequency detecting discrimination circuit 26, the received signal is discriminated with respect to respective frequency ranges. The discriminated signal is fed to a wave shaping circuit 28 via an amplifier 27 which amplifies the discriminated signals. Then, the output of the wave shaping circuit 28 is fed to a timer processing circuit 29 which performs a period conversion. Then, the torque is obtained through a map look-up against a map defining the relationship between the resultant period and the torque.

It should be noted that the torque (torque excluding the braking torque of the wheel brake unit) detected by torque sensors generally mounted on a drive shaft or an axle shaft may reflect an occurrence of wheel slippage by a variation of the direction of the torque. Therefore, such a torque can be a replacement for the torque detected by the torque sensor 3 in the shown embodiment.

To the ABS controller 4, a signal from a brake switch 5 provided as a brake operation detecting means which is turned ON in response to braking operation, wheel speed signal from front wheel speed sensors 6A and 6B provided for detecting rotation speeds of the front wheels 9 and from a rear wheel speed sensor 6C provided on a drive shaft 12 for detecting rotation speed of the rear wheels, are input in addition to the brake torque detecting signal. The ABS controller 4 sets the braking force for the wheel brake units of respective ones of the front wheels 9 and the rear wheels 1 on the basis of these input signals. Based on the set braking force, the ABS controller 4 feeds a brake control signal to an actuator 7. The actuator 7 controls braking force of the respective wheel brake units 2 (depression force to depress a brake pad or shoe on a brake disk or brake drum) by reducing a hydraulic braking fluid pressure from a master cylinder 8 based on the brake control signal from the ABS controller 4 to generate an ABS controlled braking fluid pressure and distributes the ABS controlled braking fluid pressure to respective front and rear wheels 9 and 1. It should be appreciated that the driving force of the engine 10 is transmitted through a power transmission 11, a drive shaft 12, a differential gear unit 12 and an axle shafts 14, to the rear wheels 1.

Figure 5:
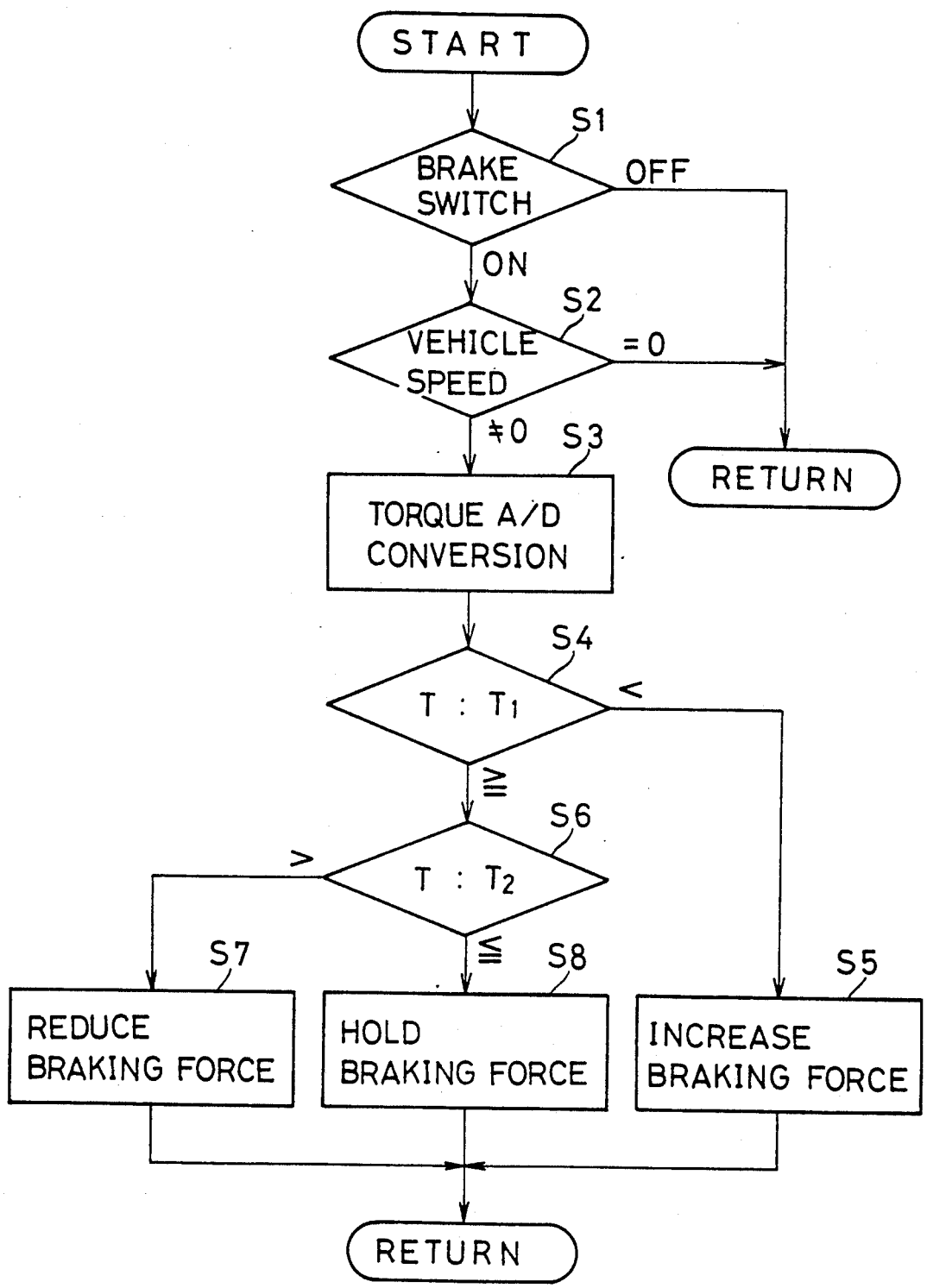
FIG. 5 is a flowchart showing a brake control operation to be performed in the embodiment of FIG. 2.

The brake control operation of the ABS controller 4 will be discussed herebelow with reference to the flowchart of FIG. 5.

At step 1 (labeled S in the drawing; the same for subsequent steps), it is discriminated whether the brake switch 5 is ON or OFF.

When the brake switch 5 is OFF, the shown routine goes to END. On the other hand, when the brake switch 5 is ON the process is advanced to step 2, in which it is discriminated whether the vehicle speed is substantially 0, on the basis of wheel speed signals from the front wheel sensors 6A and 6B and the rear wheel sensor 6C.

When the vehicle speed is substantially 0, the shown routine goes to END. On the other hand, when the vehicle speed is not substantially 0, i.e., in the braking state, the process is advanced to step 3, in which the analog signal of the torque sensor is converted into a digital signal.

At step 4, the brake torque T detected by the torque sensor 3 is compared with a first set value T1. Here, the brake torque is taken as positive in a direction toward which the rear wheel 1 as the driving wheel is driving by the engine driving torque (in a direction of an arrow in FIG. 2), and the set predetermined value T1 is set at a predetermined negative value. Namely, during deceleration, the driving torque is transmitted from the rear wheels 1 to the axle shaft 14 to drive the engine 10 for revolution, and therefore, a negative torque is generated for the axle shaft 14. When the brake is applied to the rear wheels, the driving force is reduced so that the absolute value of the negative torque is reduced. Accordingly, when the brake torque T detected at the step 4 is discriminated to be smaller than the set value T1 (absolute value is greater), it is judged that the braking force is too small. Then, the process is advanced to step 5, in which the braking fluid pressure to be supplied to the wheel brake units 2 through the actuator 7 is increased, to increase the braking force.

At step 4, when T>T1, the process is advanced to step 6 in which the brake torque T is compared with a second set value T2. The second set value T2 is set at a value close to 0. Namely, when the braking force is excessively large, to cause a locking of the rear wheels 1, the inertial torque of rear wheels 1 and the connecting body of the rear wheels 1 (axle shaft 14, the differential gear unit 13, a drive shaft 12, the transmission 11 and the reciprocating section of the engine 11 ) are exerted on the rear wheels 1 in the locking state to induce a positive torque. Accordingly, while the positive torque T is not increasing, the comparison of the brake torque T with the second set value T2 is performed so that the process is advanced to step 7 to reduce the braking fluid pressure and thereby reduce the braking force when it becomes T>T2.

On the other hand, when T<T2 is found at step 6, the current condition is held unchanged at step 8.

It should be appreciated that the pressure increasing speed and the pressure decreasing speed of the control fluid pressure can be constant, but by deriving the projected vehicle speed and varying the pressure increasing and decreasing speed depending upon the projected vehicle speed, a more precise control can be performed.

By performing a braking control as set forth above, since a locked state of the rear wheels 1 can be quickly detected to initiate a control for the braking force while detecting the brake torque at rear wheels 1, the response characteristic can be improved to obtain a higher braking performance. It should be noted that such a brake control operation performed by the ABS controller forms the braking force control means. On the other hand, in the practical construction, it is desirable to provide a similar torque sensor for the front wheels and to perform a similar braking force control for the front wheels on the basis of the detected brake torque, independently.

Figure 6:
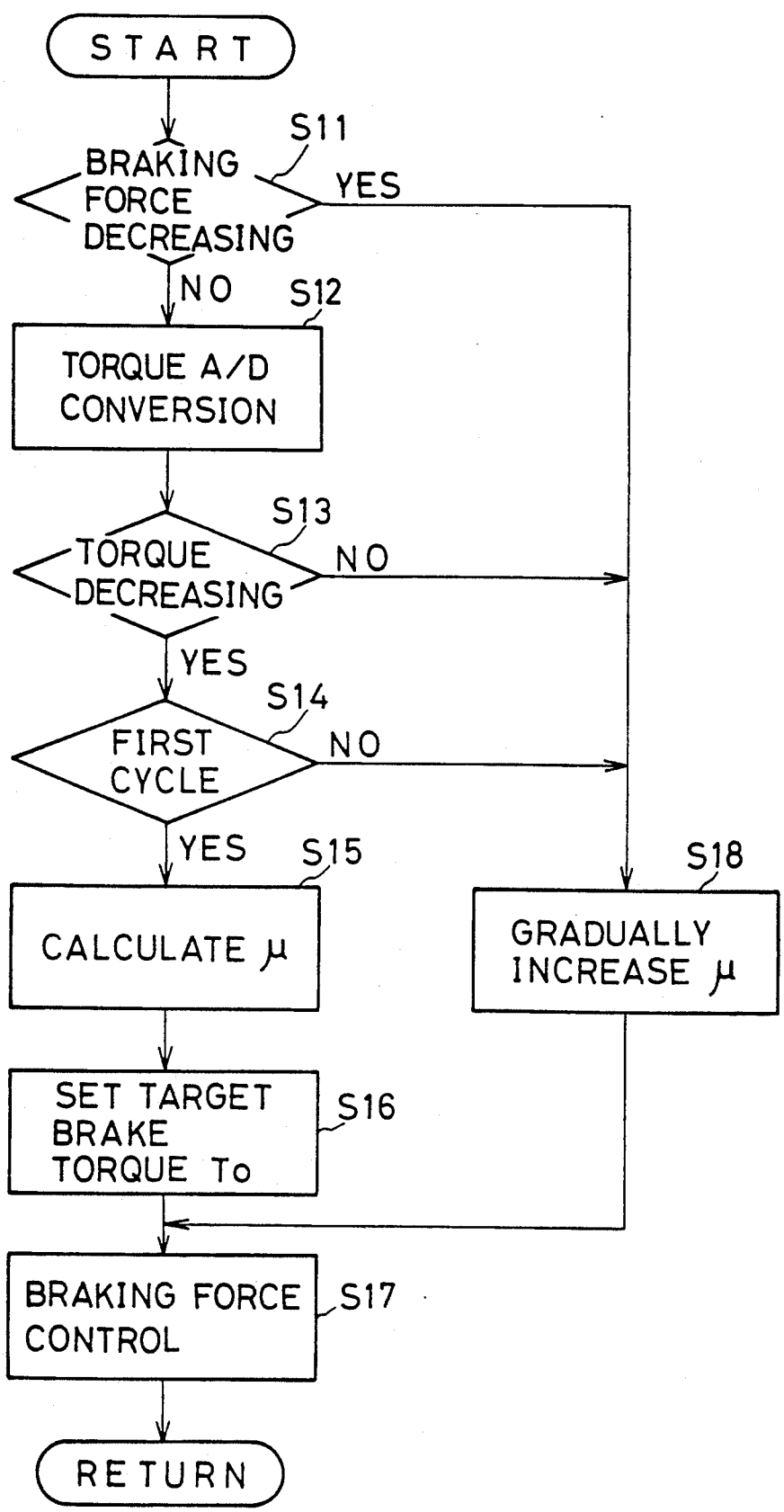
FIG. 6 is a flowchart showing a brake control operation in another embodiment of the present invention.

A discussion now will be made of an example of another embodiment of the braking force control operation, by software, with a hardware construction substantially the same as that set forth above, with reference to FIG. 6.

At step 11, it is judged whether the braking force (braking fluid pressure) in the wheel brake unit 2 is decreased or not.

When the braking force is not decreased, the process is advanced to step 12 to perform an analog-to-digital (A/D) conversion of the signal of the torque sensor 3.

At step 13, it is judged whether the A/D converted brake torque is decreasing or not.

When it is judged that the brake torque is decreasing, then it is judged that the torque reduction is due to wheel slippage at the rear wheel 1, and thus the process is advanced to step 14.

At step 14, it is judged whether the current cycle is the first cycle after causing a decrease of the torque or not.

When the first cycle is judged, the process is advanced to step 15 in which, since the brake torque T-1 detected in the immediately preceding cycle is the maximum brake torque at the current condition with respect to the current road friction coefficient $\mu$, the friction coefficient $\mu$ is calculated through the following equation.

$$\mu = 4 \cdot TRQ - 1.(R \cdot W \cdot g)$$

wherein R is a radius of the rear wheels, W is a vehicular weight, and g is a gravitational acceleration.

At step 16, with respect to the friction coefficient $\mu$, the target brake torque toward which the braking force is to be controlled is set as expressed in the following equation:

$$T_a = K_s \mu \cdot R \cdot W \cdot g$$

wherein $K_s$ is an excess ratio of the torque which is set at an appropriate value smaller than 1 for outputting the braking torque to maintain the wheel slip ratio of the rear wheel 1 with respect to the possible maximum brake torque.

At step 17, a feedback control is effected to adjust the braking force of the rear brake unit 2 toward the target brake torque $T_a$.

On the other hand, when the result at step 11 is positive, the result of the judgement at step 13 is NO and the result of the judgement at step 14 is NO, the process is advanced to step 18, in which the road friction coefficient $\mu$ is gradually increased, and the process is then advanced to step 17. By gradually increasing the braking force, if the wheel slippage is again caused, a control is again performed to reduce the braking force. Through this process, the braking performance can be increased in the range where wheel slippage is not caused. Even in this case, the increasing rate may be set depending upon the projected vehicle speed, to enhance the precision of the brake control.

Figure 7:
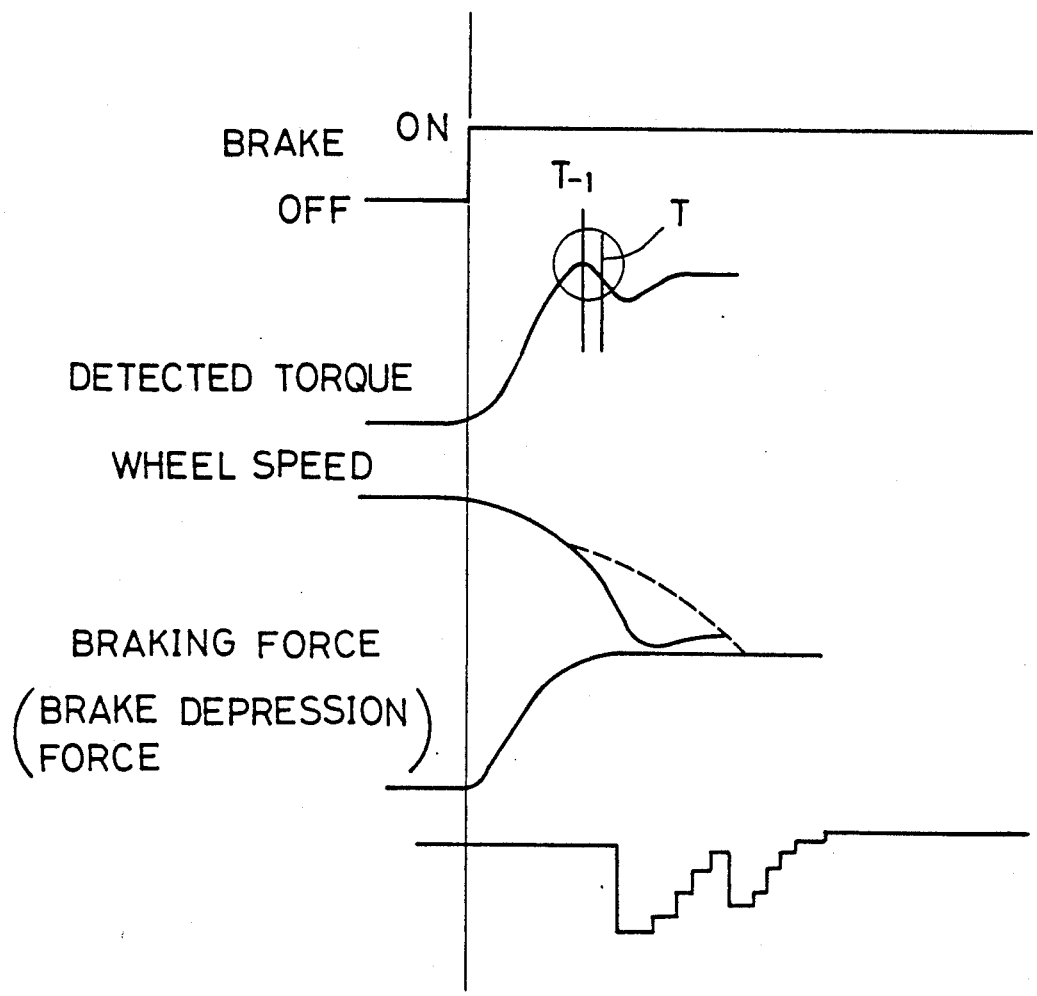
FIG. 7 is a timing chart showing a variation of conditions at each part of the embodiment.

The state in the foregoing process of control varies as shown in FIG. 7.

As set forth above, according to the present invention, it becomes possible to perform a control for a braking force in the wheel brake unit with fast response characteristics by detecting the brake torque on the wheel, and thus the performance of the ABS can be optimized.

What is claimed is

1. An anti-lock braking method for an automotive vehicle for controlling a braking force of a wheel brake unit for restricting slippage of a wheel, comprising the steps of:
   brake operation detecting for detecting operation of said wheel brake unit;
   brake torque detecting for detecting a brake torque at said wheel;
   brake torque transmitting for transmitting said brake torque detected in said brake torque detecting step;
   brake torque receiving for receiving said brake torque transmitted in said transmitting step; and
   braking force controlling for controlling said braking force of said wheel brake unit depending upon a condition including said brake torque received in said receiving step, while said operation of said wheel brake unit is detected.

2. An anti-lock braking method for an automotive vehicle as set forth in claim 1, wherein a position for detecting said brake torque in said brake torque detecting step is located between a wheel tread area of said wheel and said wheel brake unit.

3. An anti-lock braking method for an automotive vehicle as set forth in claim 1, wherein a position for detecting said brake torque in said brake torque detecting step is located between said wheel brake unit and a shaft for driving said wheel.

4. An anti-lock braking method for an automotive vehicle as set forth in claim 1, wherein said braking force controlling step includes controlling for increasing said braking force when said detected brake torque is a negative value having an absolute value greater than a predetermined torque set value T1 set at a negative value by detecting said brake torque in a direction where driving torque for driving said wheel is transmitted from a wheel driving axle to said wheel.

5. An anti-lock braking method for an automotive vehicle as set forth in claim 1, wherein said braking force controlling step includes controlling for reducing said braking force when said detected brake torque is greater than a torque set value T2 set at a positive value close to 0 by detecting said brake torque in a direction where driving torque for driving said wheel is transmitted from a wheel driving axle to said wheel.

6. An anti-lock braking method for an automotive vehicle as set forth in claim 1, wherein said braking force controlling step performs braking force controlling with characteristics depending upon a road friction coefficient which is predicted on the basis of said brake torque at said wheel at a time immediately before said brake torque decreases whenever said brake torque at said wheel detected in said brake torque detecting step is decreased while said braking force of said wheel brake unit is not decreased.

7. An anti-lock braking method for an automotive vehicle as set forth in claim 6, wherein said braking force controlling step sets a target brake torque for said wheel on the basis of said predicted road friction coefficient, and performs feedback control for said braking force on said wheel brake unit to bring said brake torque at said wheel close to said target brake torque.

8. An anti-lock braking method for an automotive vehicle as set forth in claim 7, wherein said braking force controlling step updates said target brake torque with a value which is gradually increased until a new road friction coefficient is predicted.

9. An anti-lock braking apparatus for an automotive vehicle for controlling a braking force of a wheel brake unit for restricting slippage of a wheel, comprising:
   brake operation detecting means for detecting operation of said wheel brake unit;
   brake torque detecting means for detecting brake torque at said wheel;
   brake torque transmitter means for transmitting said brake torque detected by the brake torque detecting means;
   brake torque receiver means for receiving said brake torque transmitted from said transmitter; and
   braking force controlling means for controlling said braking force of said wheel brake unit depending upon a condition including said brake torque received at said receiver, while said operation of said wheel brake unit is detected.

10. An anti-lock braking apparatus for an automotive vehicle as set forth in claim 9, wherein a position for detecting said brake torque in said brake torque detecting means is located between a wheel tread area of said wheel and said wheel brake unit.

11. An anti-lock braking apparatus for an automotive vehicle as set forth in claim 9, wherein a position for detecting said brake torque in said brake torque detecting means is located between said wheel brake unit and a shaft for driving said wheel.

12. An anti-lock braking apparatus for an automotive vehicle as set forth in claim 9, wherein said braking force controlling means includes control means for increasing said braking force when said detected brake torque is a negative value having an absolute value greater than a predetermined torque set value T1 set at a negative value by detecting said brake torque in a direction where driving torque for driving said wheel is transmitted from a wheel driving axle to said wheel.

13. An anti-lock braking apparatus for an automotive vehicle as set forth in claim 9, wherein said braking force controlling means includes control means for reducing said braking force when said detected brake torque is greater than a torque set value T2 set at a positive value close to 0 by detecting said brake torque in a direction where driving torque for driving said wheel is transmitted from a wheel driving axle to said wheel.

14. An anti-lock braking apparatus for an automotive vehicle as set forth in claim 9, wherein said braking force controlling means performs braking force control with characteristics depending upon a road friction coefficient which is predicted on the basis of said brake torque at said wheel at a time immediately before said brake torque decreases whenever said brake torque on said wheel detected by said brake torque detecting means is decreased while said braking force of said wheel brake unit is not decreased.

15. An anti-lock braking apparatus for an automotive vehicle as set forth in claim 14, wherein said braking force controlling means sets a target brake torque at said wheel on the basis of said predicted road friction coefficient, and performs feedback control for said braking force at said wheel brake unit to bring said brake torque on said wheel close to said target brake torque.

16. An anti-lock braking apparatus for an automotive vehicle as set forth in claim 15, wherein said braking force controlling means updates said target brake torque with a value that is gradually increased until a new road friction coefficient is predicted.

* * * * *